Figure 1:
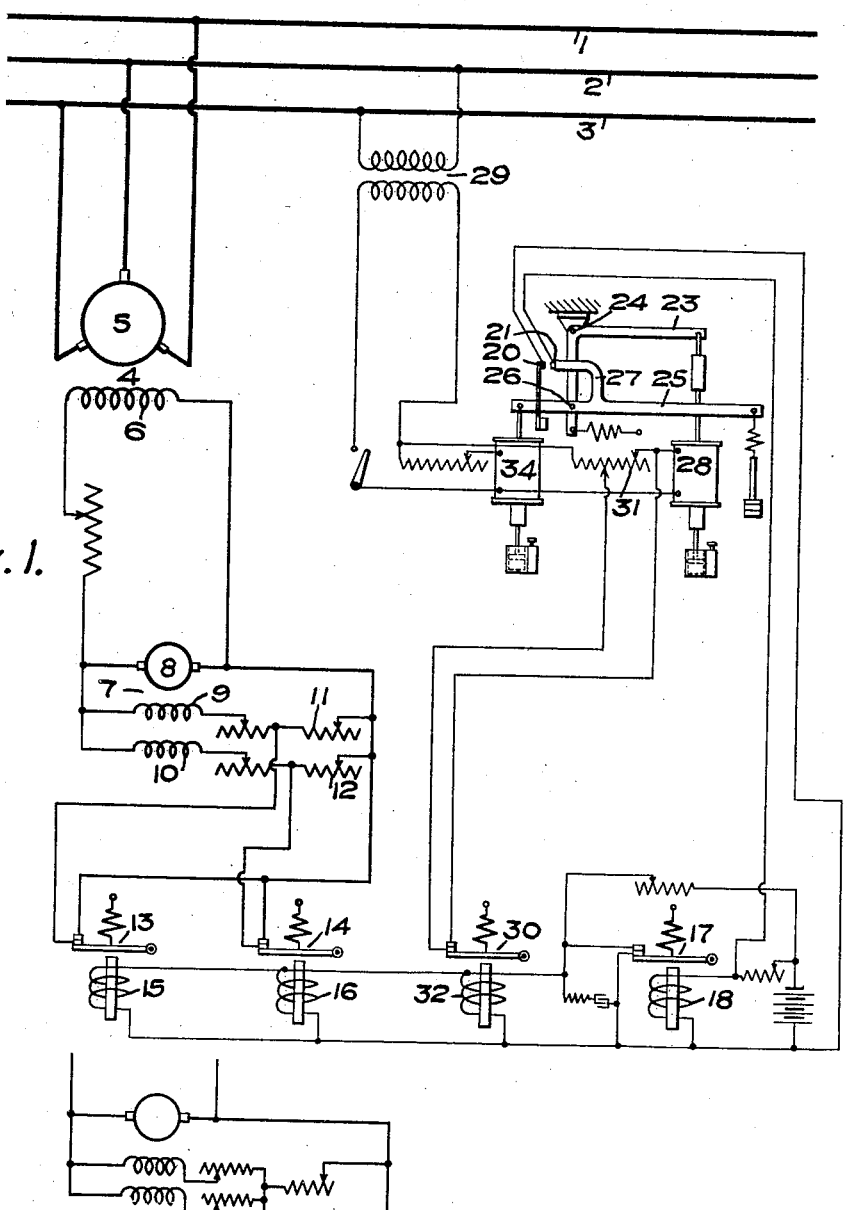

C. A. BODDIE.
REGULATING SYSTEM FOR DYNAMO ELECTRIC MACHINES.
APPLICATION FILED APR. 12, 1916.

1,284,866.

Patented Nov. 12, 1918.

WITNESSES:

INVENTOR
Clarence A. Boddie.
BY
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

REGULATING SYSTEM FOR DYNAMO-ELECTRIC MACHINES.

1,284,866.    Specification of Letters Patent.    Patented Nov. 12, 1918.

Application filed April 12, 1916. Serial No. 90,671.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Regulating Systems for Dynamo-Electric Machines, of which the following is a specification.

My invention relates to voltage and current regulators for dynamo-electric machines and particularly to regulators of the kind in which the regulation is effected by rapidly opening and closing a circuit in shunt to a resistor that is connected in series with the field-magnet winding of the dynamo-electric machine.

The object of my invention is to provide means whereby an ordinary voltage regulator of the character above specified may be rendered capable of use in connection with an exciter or other dynamo-electric machine having a large exciting current without subjecting the contact members of the relays of the regulator to undue arcing and burning and to the resultant sticking or roughening and excessive wear.

A further object of my invention is to provide means whereby an exciter may be rendered more promptly and effectively responsive to the control of a voltage regulator or to the impulses from a regulator the operation of which is controlled by the quantity regulated.

When voltage regulators have heretofore been employed in connection with exciters of large capacity and having large field currents, it has been customary to divide the regulating resistors, that are connected in series with the field-magnet winding, into a plurality of sections and to employ a corresponding number of relays for respectively controlling shunt circuits to the several sections. However, with the ever-increasing sizes of exciters and other dynamo-electric machines, it has recently been found that, when a certain field current is exceeded, no advantage is gained in employing more than two, or possibly three, relays in connection with a single resistor. This condition has served to limit the capacities of regulators, as heretofore constructed and arranged, and the present invention is intended to remove this limitation upon the field of application of regulators.

When the rules relating to dynamo design are applied to the design of an exciter, the time of response to the control of a voltage regulator becomes large, if the capacity of the exciter is large or if its speed is low or if the proper number of poles is not selected. Exciters which are direct connected to slow-speed, water-wheel generators are often so slow in their response to a voltage regulator as to render the regulator practically useless. The laws controlling the response of an exciter to a regulator have been investigated and it has been found that the self induction of the field windings is a vital factor. That is, if a generator field is to be built up rapidly, the voltage available to build it up must be high and the self induction of the field circuit must be low. By splitting up the field into two or more parallel circuits the self induction is reduced, since there are fewer turns in series, thereby permitting standard design proportions to be followed and, at the same time, the machine may be made to respond to a voltage regulator.

By properly subdividing the field circuit into two or more parallel paths, machines of practically unlimited capacity may be used as exciters, under the control of the present type of voltage regulators.

Figure 2:
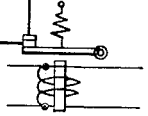

My invention is illustrated in the accompanying drawing, the Figure 1 of which diagrammatically illustrates an electrical system embodying the same and Fig. 2 represents a modification of a portion thereof.

The system of Fig. 1 comprising distributing conductors 1—2—3, a generator 4 having an armature 5 that is connected to the distributing-circuit conductors and a field-magnet winding 6 that receives exciting current from an exciter 7 having an armature 8. The exciter 7 is provided with two field-magnet windings 9 and 10, respectively, both of which may be located, if desired, upon the same pole pieces of the exciter or one of which may be located upon certain of the pole pieces and the other upon the remaining pole pieces or they may be otherwise suitably arranged. The two windings or parts of windings are preferably, though not necessarily, similar, and they are connected in parallel with each other and arranged to supplement each other or to act in conjunction. While, as here shown, the total field-magnet winding comprises two parts, it will be understood, of course, that any suitable number of field-magnet windings or parts of field-magnet windings may be employed.

In series with the field-magnet windings, or parts of field-magnet windings, are resistors 11 and 12, respectively, the effective values of which are controlled by similarly acting relays 13 and 14, respectively, that constitute parts of a voltage regulator. If desired, the resistors may be divided into two or more sections and a relay may be employed in connection with each section. The relays 13 and 14 are provided with energizing windings 15 and 16, the circuits of which are controlled by a third relay 17 having an energizing winding 18 that is controlled by a pair of stationary and movable contact members 20 and 21, respectively, that constitute parts of the main control element of the regulator. The said main control element comprises also a bell-crank lever 23 that is pivoted at 24 to a stationary support, a lever 25 that is pivotally connected at 26 to the bell-crank lever 23 and is provided with an upwardly and laterally-extending arm 27 upon which the contact member 21 is mounted. The lever 23 is actuated by means of an electromagnet having an energizing winding 28 that receives energy from the circuit 1—2—3 through a transformer 29 and the degree of energization of which is controlled by means of a relay 30 that is adapted to open and close a circuit in shunt to a resistor 31 which is connected in series with the said winding. The relay 30 is provided with an energizing winding 32 that is connected in parallel with the energizing windings 15 and 16 of the relays 13 and 14 and is controlled by the relay 17. The lever 25 is actuated by an electromagnet having a winding 34 that is energized in proportion to the voltage of the circuit 1—2—3 and receives current therefrom through the transformer 29.

The regulator *per se* constitutes no part of the present invention, and, accordingly, its operation will be described only in a general way. The winding 34 serves to determine the position of the lever 25 in accordance with the voltage of the circuit 1—2—3, while the winding 28, by reason of its being alternately fully and partially energized, serves to vibrate the contact member 21 into and out of engagement with the member 20. Engagement and disengagement of the contact members 20 and 21 cause the contact members of the relays 13, 14, 17 and 30 to vibrate into and out of engagement, the relays 13 and 14 serving to determine the effective values of the currents traversing the field-magnet windings 9 and 10, so as to cause the exciter voltage to vary to correct for the tendency of the generator voltage to vary.

In view of the division of the exciter field-magnet winding into several parts, the current traversing each part and, therefore, the current that each relay is required to handle, is reduced in proportion to the number of divisions of the field-magnet winding. In this way, the relays are enabled to successfully interrupt the circuits in shunt to the resistors that are connected in series with the several divisions of the field magnet, and, by reason of the smaller amounts of current handled by them, excessive burning and roughening, as well as sticking of the contact members, are avoided. The response to fluctuations in the voltage of the distributing circuit 1—2—3 is also prompt and effective because the time constant of each section of the field-magnet winding is less than that of the several sections connected in series.

The subdivision of the field-magnet winding of the exciter into two or more parallel sections does not always require the use of as many relays as there are field winding sections, as two or more sections may be controlled by a single relay, as shown in Fig. 2. This arrangement is useful when a single relay is capable of handling the field current, but it is desired to cause the exciter to respond more promptly to the impulses applied to it by the regulator.

I claim as my invention:

1. The combination with a dynamo-electric machine having a plurality of supplementary parallel-connected field-magnet windings and a resistor in series with each of said windings, of a regulator effective under all conditions of operation to simultaneously and similarly control the said resistors.

2. The combination with a dynamo-electric machine having a plurality of supplementary parallel-connected field-magnet windings and a resistor in series with each of said windings, of a regulator effective under all conditions of operation to simultaneously open and close shunt circuits to all of the said resistors.

3. The combination with a dynamo-electric machine having a plurality of supplementary parallel-connected field-magnet windings and a resistor in series with each of said windings, of a regulator effective under all conditions of operation to simultaneously and similarly control the effective values of the currents traversing all of the said windings.

4. The combination with a dynamo-electric machine having a plurality of supplementary parallel-connected field-magnet windings and a resistor in series with each of said windings, of a regulator having relays associated respectively with said windings effective under all conditions of operation to similarly and simultaneously control the effective values of the currents traversing the said windings.

In testimony whereof, I have hereunto subscribed my name this 31st day of March, 1916.

CLARENCE A. BODDIE.